United States Patent [19]

Kawai et al.

[11] 4,220,822
[45] Sep. 2, 1980

[54] TIME DIVISION MULTIPLEX TRANSMISSION SYSTEM

[75] Inventors: Ituo Kawai, Kobe; Hisaharu Maeda, Osaka, both of Japan

[73] Assignee: Terasaki Denki Sangyo Kabushiki Kaisha, Osaka, Japan

[21] Appl. No.: 19,409

[22] Filed: Mar. 12, 1979

Related U.S. Application Data

[63] Continuation of Ser. No. 780,114, Mar. 22, 1977, abandoned.

[30] Foreign Application Priority Data

Apr. 30, 1976 [JP] Japan .................................. 51/49635

[51] Int. Cl.² ............................................... H04J 3/08
[52] U.S. Cl. .......................................... 370/83; 370/86; 370/108
[58] Field of Search ............ 179/15 AL, 15 BB, 15 A

[56] References Cited

U.S. PATENT DOCUMENTS

| 3,757,050 | 9/1973 | Mizote | 179/15 AL |
|---|---|---|---|
| 3,789,148 | 1/1974 | Ishii | 179/15 AL |
| 3,804,986 | 4/1974 | Wakamatsu | 179/15 A |
| 3,846,587 | 11/1974 | Schenkel | 179/15 AL |
| 3,870,825 | 3/1975 | Roberts | 179/15 AL |
| 3,937,892 | 2/1976 | Bloch | 179/15 AL |
| 4,027,301 | 5/1977 | Mayer | 179/15 A |

Primary Examiner—David L. Stewart
Attorney, Agent, or Firm—Staas & Halsey

[57] ABSTRACT

A time division multiplex transmission system for communication of a data signal in a time-multiplex fashion over a data signal transmission path comprises a clock pulse generator for generating two-phase clock pulses including a first train of one phase and a second train of opposite phase. The system further comprises a plurality of transmitters and receivers, each including a wave shaper for demodulating the two-phase clock pulses and producing a single-phase clock pulse train, and a station selection circuit for processing the single-phase clock pulse train to identify that period of time during which the particular transmitter or receiver is selected for transmission or reception. Each transmitter and receiver also comprises a reset signal detector circuit, responsive to the detection of an intermission period in the clock pulse train, to reset the station selection circuit of the particular transmitter or receiver, thus achieving overall synchronization of the transmitters and receivers in the system.

28 Claims, 17 Drawing Figures

TIME DIVISION MULTIPLEX TRANSMISSION SYSTEM

This is a continuation, of application Ser. No. 780,114 filed Mar. 22, 1977 now abandoned.

BACKGROUND OF THE INVENTION

1. Field of the Invention

The present invention relates to a time division multiplex transmission system. More specifically, the present invention relates to an improvement in synchronization among the transmitters and receivers in such a time division multiplex transmission system.

2. Description of the Prior Art

A time division multiplex transmission system for data communication among transmitters and receivers in a synchronized manner has been proposed and put into practical use. The data to be communicated may comprise a plurality of contact signals obtainable form limit switches, relay contacts, push button switches and the like, or a plurality of output signals obtainable from a semiconductor circuits such as a transistor circuit and the like. Such signals are often referred to as a digital signal or a binary signal.

For the purpose of synchronization in the system, a train of clock pulses is utilized, and the data is communicated in synchronism with the clock pulses. More specifically, a typical time division multiplex transmission system comprises a plurality of transmitters and a plurality of receivers which are adapted to be operable in sunchronism with the clock pulses, and a transmission path for interconnection thereof. While the clock pulses are transmitted on the transmission path, the data is transmitted and received among the selected transmitter and receiver in accordance with the order of selection of the transmitters and receivers.

Figure 1A:
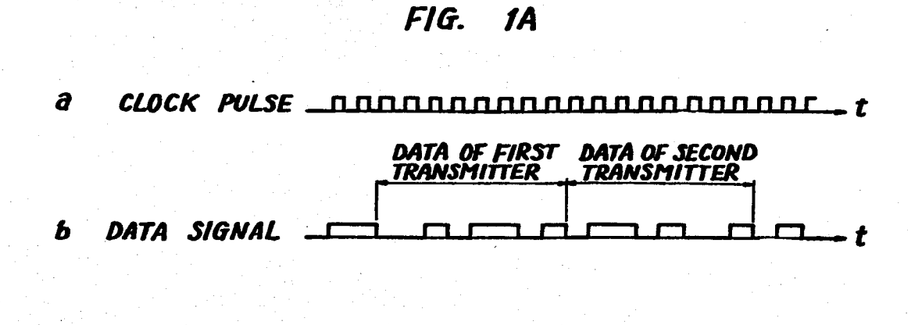
FIG. 1A shows wave forms of a train of clock pulses and a train of data signals in an enlarged timing scale.
Figure 1B:
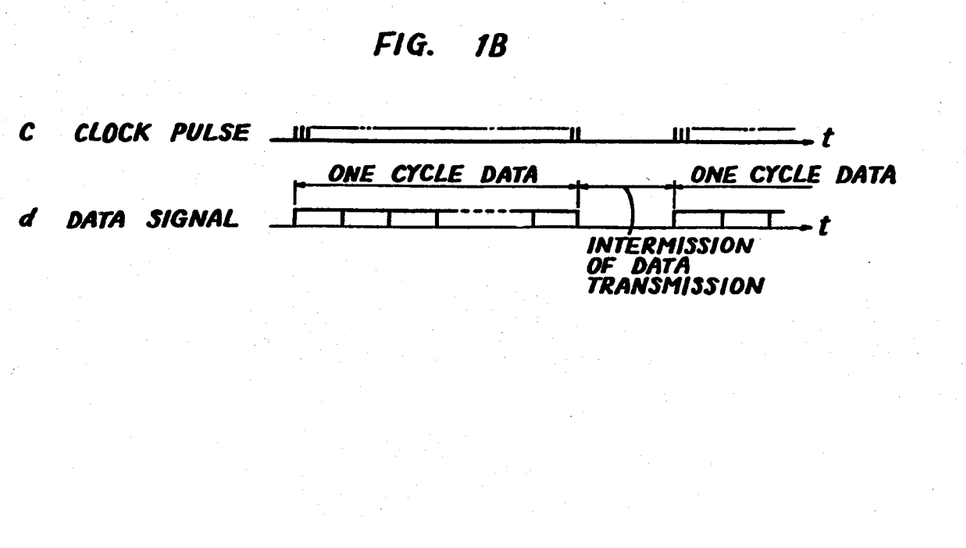
FIG. 1B shows wave forms of the same clock pulses and data signals in a reduced timing scale.

FIG. 1A shows wave forms of a train of clock pulses and a train of data signals in an enlarged timing scale, while FIG. 1B shows wave forms of the same clock pulses and data signals in a reduced timing scale. It is pointed out that the FIG. 1A graph is aimed to show in detail the data to be transmitted only from a few transmitters, whereas the FIG. 1B graph is aimed to show the data to be transmitted by all the transmitters in the system. With particular reference to FIG. 1A, it should be appreciated that the system has been structured such that a plurality of transmitters are sequentially selected, each for a predetermined time period, while each transmitter is adapted to transmit eight different digital signals. More specifically, when the first transmitter is selected, a parallel input signal of eight bit positions is converted into a series of signal of eight bit positions as a function of the clock pulses and is transmitted on the data signal transmission line. After transmission of the data signal for the first transmitter, the second transmitter is selected and a further data signal of eight bit positions is transmitted similarly. The data signal transmitted by the first transmitter is received by the corresponding first receiver controlled to be mated therewith. Thereafter, the second receiver is controlled to be mated with the second transmitter to receive the second data signal. Thus, data communication, i.e. transmission and reception of the data signals, is carried out in sequence between the transmitters and receivers. After transmission and reception of the data signals by all the transmitters and receivers in the system are over, the clock pulses are discontinued for a given time period; thus, a train of clock pulses is followed by a predetermined intermission period. After the lapse of that time period, the clock pulses are again transmitted, whereby transmission and reception of the data signals are carried out again in turn starting from the first transmitter and receiver.

The data signal transmission described in the foregoing, starting from the first selected transmitter and receiver and ending at the finally selected transmitter and receiver, is referred to as one cycle data signal transmission. With particular reference to FIG. 1B, it should be appreciated that such one cycle data signal transmission is carried out repeatedly, with intermission of data communication for a given time period therebetween. More specifically, continual connection is not made between each input terminal of the transmitter and the corresponding output terminal of the receiver, but rather, intermittent connection of each input and output out of a plurality of inputs and outputs takes place, in turn, for a given time period. In other words, time is divided so as to be assigned to each input and output, so that the same transmission line is shared to perform the transmission and reception of the data signal between each input and output out of a plurality of inputs and outputs.

The system thus described, for communicating a plurality of data signals by the use of a common transmission line through time division, is referred to as a time division multiplex transmission system.

In a typical conventional time division multiplex transmission system, a clock pulse generator for generating clock pulses for control of time division is provided in each of the transmitters and receivers. Alternatively, a system is structured such that the clock pulses are generated in each of the transmitters and receivers by the use of a carrier wave of the data signal. However, since the conventional system has no independent clock pulse transmission line, it suffers from various shortcomings.

Firstly, since each of the transmitters and receivers in a conventional system comprises a respective inherent oscillator used as a clock pulse generator, lack of stability of the characteristics of the respective oscillators due to the ambient conditions, such as temperature, humidity, and the like, causes problems. If the phase of the clock pulses is shifted because of variation of the respective oscillation frequency, synchronization of the operation of the system cannot be maintained and the system becomes inoperative. On the other hand, with the system utilizing the carrier wave of the data signal for the purpose of synchronization, it is necessary to employ operations such as modulation and demodulation, which complicates the structure of the system. Furthermore, the conventional system is vulnerable failure of synchronization because of disturbances such as noise and the like.

Another problem is that, since the switching speed of channels for multiplex transmission cannot be changed as desired with a conventional system, the switching speed is fixed and cannot be adjusted.

A further problem encountered with a conventional system is that, since the number of clock pulses in each train of the clock pulses cannot be adjusted, the number of digital signals being communicated for each transmitter-receiver pair is half way fixed and cannot be increased or decreased. Thus, with a conventional system, ability to expand of the number digital signals being processed for each data signal cannot be expected.

With a conventional system, the data signal transmission and the reset signal transmission are achieved by the same transmission line. Therefore, it is necessary that the system be structured so as to discriminate such signals, which complicates the circuit configuration of the system but nevertheless is subject to a disturbance.

SUMMARY OF THE INVENTION

Briefly described, the present invention comprises a time division multiplex transmission system for communication between a transmitter and a receiver of a data signal including a plurality of bits in a time division multiplex fashion by the use of a data signal transmission line, characterized in that multiphase clock pulses, commonly and applied to the system, are transmitted through a clock pulse transmission line to said transmitter and receiver, and single phase clock pulses are locally generated by evaluating a differential value between voltages of said multiphase clock pulses in each of said transmitter and receiver, which single phase clock pulses are utilized for synchronized multiplex operation in each of said transmitter ad receiver. Since the single phase clock pulses are generated locally, in the respective transmitter and receiver, through a differential operation performed on the multiphase clock pulses transmitted through a clock pulse transmission line installed separately from a data signal transmission line, any disturbance such as noise occurring in the clock pulse transmission line can be eliminated during such local generation of the single phase clock pulses in the respective transmitter and receiver. Since the generated single phase clock pulses are immune to external disturbance occurring in the clock pulse transmission line, improved synchronization can be achieved in the inventive system.

Preferably, means are provided for generating two-phase clock pulses including a first train of clock pulses of one phase and a second train of clock pulses of opposite phase, and clock pulse transmission path means are provided coupled to said clock pusle generating means for separately transmitting said first train of one phase clock pulses and said second train of opposite phase clock pulses of said two-phase clock pulses. The transmitter is coupled to said clock pulse transmission path means and to said data signal transmission line, and comprises means responsive to said first train of one phase clock pulses and said second train of opposite phase clock pulses for providing a train of single phase clock pulses having a differential value of said first train of one phase clock pulses and said second train of opposite phase clock pulses, and means responsive to said single phase differential value clock pulses for transmitting a parallel data signal of a plurality of bits in a series fashion to said data signal transmission line. The receiver is also coupled to said clock pulse transmission path means and said data signal transmission line, and comprises means responsive to said first train of one phase clock pulses and said second train of opposite phase clock pulses for providing a train of single phase clock pulses having a differential value of said first train of one phase clock pulses and said second train of opposite phase clock pulses, and means responsive to said single phase differential value clock pulses for receiving the serial data signal of a plurality of bits in a parallel fashion.

More preferably, each of said first and second trains of clock pulses of one and opposite phase, respectively, is adapted to cover a plurality of station selection time periods, each including a pluarality of clock pulses requred for communication of said data signal of said plurality of bits, a plurality of said transmitters are provided, each said transmitter further comprising means responsive to said single phase differential value clock pulses for providing an enabling signal for identifying a predetermined one of said station selection time periods to be uniquely alotted to its own transmitter, said transmitting means being structured to be enabled in response to said enabling signal, and a plurality of said receivers are provided, each said receiver further comprising means responsive to said single phase differential value clock pulses for providing an enabling signal for identifying a predetermined one of said station selection time periods to be uniquely alotted to its own receiver, said receiving means being structured to be enabled responsive to said enabling signal. At least one pair of a preselected one of said plurality of transmitters and a preselected one of said plurality of receivers is adapted such that said preselected transmitter and said preselected receiver are preset to identify the same station selection time period, whereby said preselected transmitter and said preselected receiver establish a mating relation during the said same station selection time period for communication of the data signal therebetween.

More preferably, said two-phase clock pulses are adapted to include a predetermined intermission time period between the consecutive clock pulse trains and each of said transmitters and receivers further comprises means responsive to said predetermined intermission time period for returning said enabling signal providing means to an initial condition. As a result, complete synchronism of all of the transmitters and receivers in the system can be achieved with ease.

Therefore, a principal object of the present invention is to provide an improved time division multiplex transmission system for communication of a data signal, including a plurality of bits, in a time division multiplex fashion, wherein transmitted are clock pulses are immune to external disturbance.

Another object of the present invention is to provide an improved time division multiplex transmission system for communication of a data signal, including a plurality of bits, in a time division multiplex fashion, wherein complete synchronism in the whole system can be maintained with ease.

A further object of the present invention is to provide an improved time division multiplex transmission system for communication of a data signal, including a plurality of bits, in a time division multiplex fashion, wherein the number of clock pulses in one cycle data signal period can be varied with ease, whereby the number of pairs of the transmitter and receiver to be mated with each other in said one cycle data signal period can be varied with ease.

Still another object of the present invention is to provide an improved time division multiplex transmission system for communication of a data signal, including a plurality of bits, in a time division multiplex fashion, wherein station selection in the transmitters and receivers can be achieved in the same circuit configuration, with the result that the circuit configuration of the whole system can be made simple.

An aspect of the present invention is that, since the multiphase clock pulses are generated commonly in the whole system and the single phase clock pulses are generated responsive to said multiphase clock pulses locally in each of the transmitters and receivers, which single phase clock pulses are utilized for synchronized multiplex operation in the respective transmitters and receivers, stability of the frequencies of the clock pulses does not impact on synchronization in the system.

These objects and other objects, features, aspects and advantages of the present invention will become more apparent from the following detailed description of the preferred embodiments of the present invention made in conjunction with the accompanying drawings.

BRIEF DESCRIPTION OF THE DRAWINGS

FIG. 6A shows a detailed block diagram of one embodiment of the rectangle wave generator 1a;

DESCRIPTION OF THE PREFERRED EMBODIMENTS

Figure 1C:
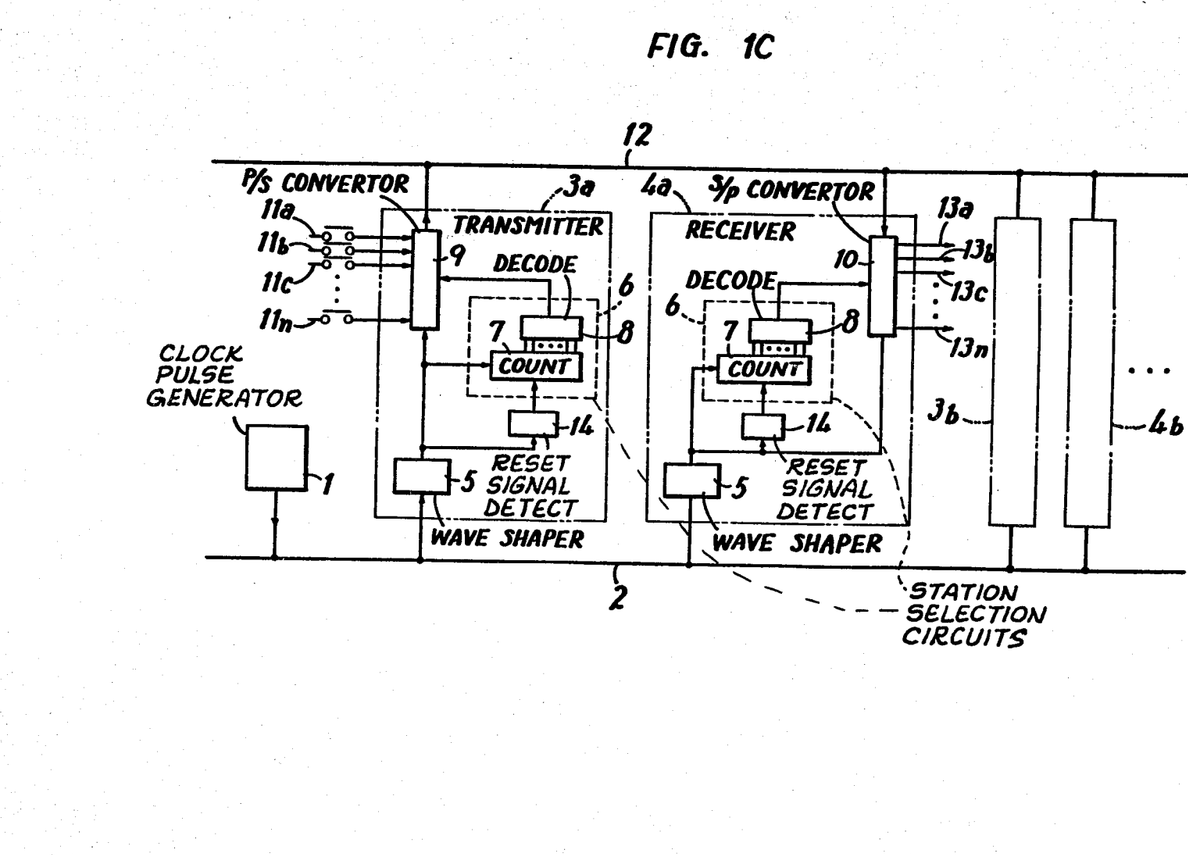
FIG. 1C shows a block diagram of a time division multiplex transmission system of one embodiment in accordance with the present invention.

FIG. 1C shows a block diagram of a time division multiplex transmission system of one embodiment in accordance with the present invention. Referring to FIG. 1, the embodiment shown comprises a plurality of transmitters 3a, 3b, . . . and a plurality of receivers 4a, 4b, . . ., each being structured for communication of a data signal of a plurality of bits, and coupled to a data signal transmission line 12 and a clock pulse transmission line 2, the latter connected to receive clock pulses from a common clock pulse generator 1. It is pointed out that the transmitter 3a and the receiver 4a have been illustrated in some detail while the remaining transmitters and receivers have been illustrated in a simplified manner for facility of illustration. According to the present invention, only a single common clock pulse generator is provided in the whole system, such that synchronization is maintained among the transmitters and receivers. The clock pulse generator 1 is structured to generate a succession of clock pulse trains (FIGS. 1A and 1B), each train including a plurality of station selection time periods (FIG. 1B), each period comprising the same predetermined number of clock pulses as the said plurality of bits. Preferably, the clock pulse generator 1 is structured such that the number of clock pulses in each clock pulse train is variable, and a predetermined intermission time period (FIG. 1B) is provided between the consecutive pulse trains. Preferably, the clock pulse generator 1 is structured to generate multiphase clock pulses or two-phase pulses. The clock pulse generator 1 may comprise any type of oscillator, such as a crystal oscillator, an RC oscillator, an astable multivibrator, or the like, wherein the generated wave form is converted to a rectangular wave form.

Figure 2A:
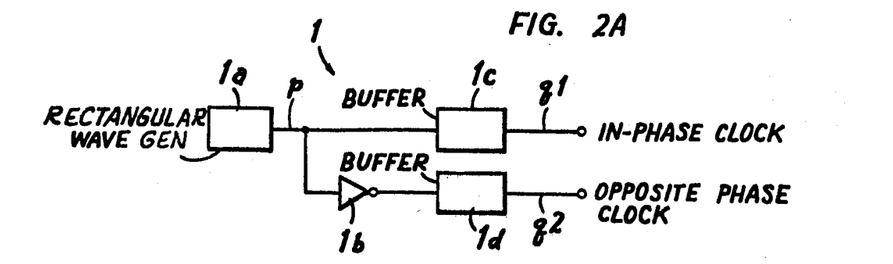
FIG. 2A shows a block diagram of the clock pulse generator 1.
Figure 2B:
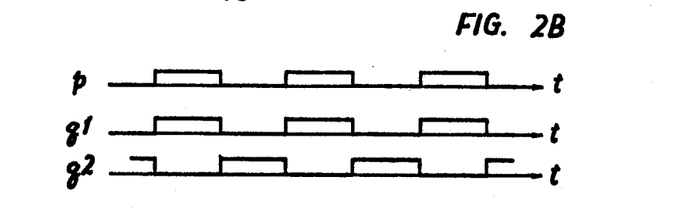
FIG. 2B shows wve forms of the signals at various portions in the FIG. 2A diagram.

FIG. 2A shows a block diagram of the clock pulse generator 1 and FIG. 2B shows wave forms of the signals at various portions in the FIG. 2A diagram. Referring to FIG. 2A, the clock pulse generator 1 is structured such that two-phase clock pulses, i.e. clock pulses of in-phase and opposite-phase, are generated. To that end, the generator 1 shown comprises a rectangular wave generator 1a, a buffer amplifier 1c directly coupled to the output of the rectangular wave generator 1a, and another buffer amplifier 1d coupled through an inverter 1b to the output of the rectangle wave generator 1a. The rectangular wave form ouput obtainable from the rectangular wave generator 1a both indirectly, through the inverter 1b and directly, applied to the respective buffer amplifiers 1d and 1c, respectively. With simultaneous reference to FIG. 2B, the rectangular wave generator serves to generate a rectangular wave form p. The in-phase clock pulse q1 is obtained by amplifying the said rectangular wave form with the buffer amplifier 1c, while the opposite phase clock pulse q2 is obtained by inverting the polarity of the said rectangular wave form through the inverter 1b and by amplifying the output of the inverter 1b via the buffer amplifier 1d.

The two-phase clock pulses thus generated by the generator 1 (FIG. 1C) are transmitted through the clock pulse transmission line 2 provided as a special purpose line. The clock pulse transmission line 2 of the embodiment shown comprises two lines for transmission of the in-phase clock q1 and the opposite-phase clock q2. The two-phase clock pulses thus transmitted are received by the transmitters 3a, 3b, . . . and receivers 4a, 4b, . . . . Now returning to FIG. 1C, the transmitter 3a is shown comprising a wave form shaper 5 for processing the said two-phase clock pulses and demodulating the original clock pulse trains, a counter 7 for counting the number of clock pulses in each clock pulse train, a reset signal detector 14 responsive to the succession of clock pulse trains to detect the intermission time period of the consecutive clock pulse trains and to provide a reset signal to the counter 7, a decoder 8 coupled to the counter 7 (the two forming station selection circuit 6) for decoding the count output of the counter 7 and for generating an enabling signal identifying a predetermined station selection time period uniquely alloted to its own transmitter 3a, and parallel/serial converter 9 responsive to the enabling signal by way of the decoded output from the decoder 8 to be enabled to convert an input of the plurality of paralel bits 11a, 11b, 11c, . . . 11n into a series bit signal as a function of the demodulated clock pulses from wave form shaper 5. The receiver 4a is of substantially the same structure as that of the transmitter 3a (the same reference numerals have been used as applicable), except that the parallel/serial converter 9 has been replaced by a serial/parallel converter 10. The serial/parallel converter 10 is responsive to the enabling signal by way of the decoded output of the decoder 8 to be enabled to convert the series bit signal transmitted through the data signal transmission line 12 into an output of a plurality of parallel bits 13a, 13b, 13c, ... 13n as a function of the demodulated clock pulses obtainable from the wave form shaper 5. It is pointed out that the counter 7 and the decoder 8 constitute a station selection circuit 6.

Figure 3:
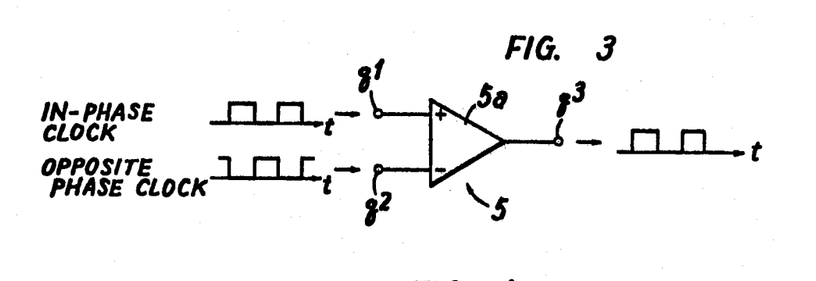
FIG. 3 shows in more detail the structure of the wave form shaper 5 in the FIG. 1 embodiment.

FIG. 3 shows in more detail the structure of the wave form shaper 5. Referring to FIG. 3, the wave form shaper 5 typically comprises a differential amplifier (or voltage comparator) 5a, wherein the differential voltage between the said in-phase clock pulses q1 and the opposite-phase clock pulses q2 is obtained by comparison and amplified to provide a single phase demodulated clock pulse q3. According to the embodiment shown, noise coming into the clock pulse transmission line 2 appears with the same polarity both to the in-phase clock pulse transmission line and the opposite-phase clock pulse transmission line, so that the noise components on both transmission lines are offset with respect to each other by the differential amplifier (or voltage comparator) 5a, with the result that no the noise has no influence on the output wave form from the wave form shaper 5.

Figure 4:
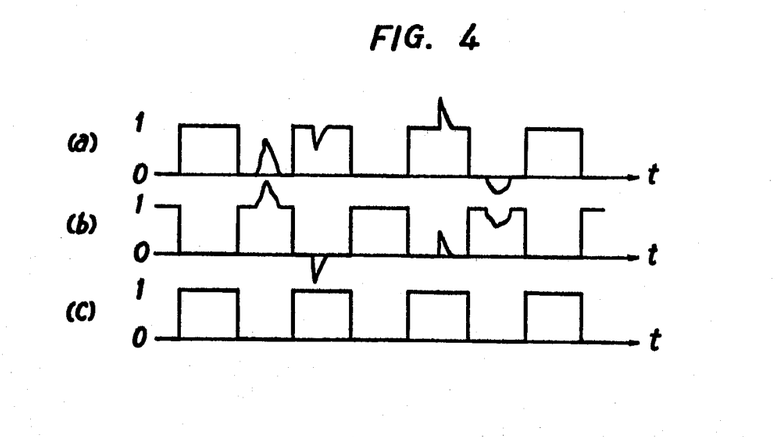
FIG. 4 shows the wave forms of the incoming in-phase and opposite phase clock pulses to be received by the wave form shaper 5 and the output pulses from the amplifier 5.

More specifically, FIG. 4 shows the wave forms of the incoming in-phase and opposite-phase clock pulses to be received by the differential amplifier (or voltage comparator) 5a, and the output clock pulses from the amplifier (or voltage comparator) 5a. Referring to FIG. 4, the wave forms are shown comprising a noise component occuring with the same polarity as to both the in-phase and opposite phase clock pulses (a) and (b), respectively. However, a single phase demodulated clock pulse (c), as well shaped, is obtained by means of the wave form shaper 5 with the noise component removed.

Figure 5A:
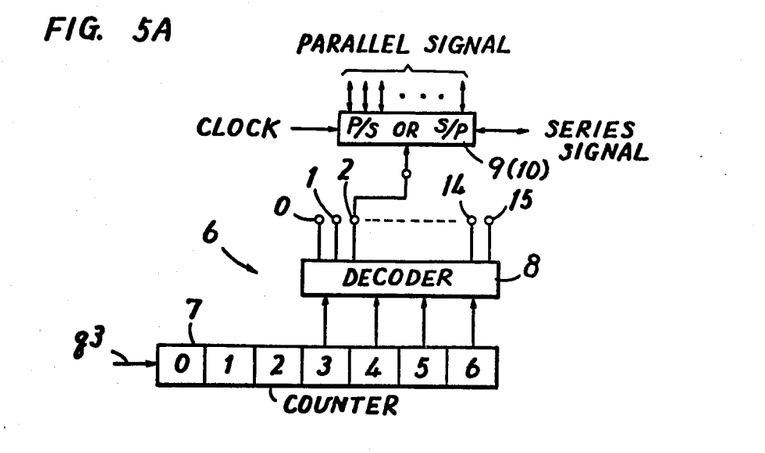
FIG. 5A shows a detailed block diagram of the selection circuit 6 in the transmitters and receivers.

FIG. 5A shows a detailed block diagram of the station selection circuit 6 in the transmitters and receivers. As described previously, the station selection circuit comprises the counter 7 and the decoder 8 as major elements. Referring to FIG. 5A, the counter 7 is shown comprising a seven-digit binary counter by way of an example, while the decoder 8 is shown as comprising a binary-decimal converter for converting the four-bit binary number in the four more significant bit positions in the counter 7 into decimal numbers 0 through 15 of individual parallel bit outputs. Referring to FIG. 5A, the block 9 (10) is shown to indicate either the parallel/serial converter 9 of a transmitter or the serial/parallel converter 10 of a receiver, as the case may be. More specifically, the outputs from the bit positions 3 through 6, i.e. the fourth through seventh bit positions, of the counter 7 are connected, in parallel fashion, to the decoder 8, such that the contents in the bit positions 3 through 6 of the counter 7 may be converted into a decimal number to be represented as the corresponding one of the individual decimal number outputs from the decoder 8.

It should be appreciated that the contents in the bit positions 3 through 6, i.e. the fourth through seventh bit positions, of the counter 7 change each time eight single phase clock pulses q3 are received by the counter 7. In the case where the contents in the bit positions 3 through 6 of the counter are all logic zero, the output from the decimal number 0 of the decoder 8 becomes logic one, while the remaining decimal number outputs of the decoder 8 are all logic zero. In case where the bit position 3 of the counter 7 becomes logic one while the bit positions 4 through 6 of the counter 7 become logic zero, the outputs from the decimal number 1 of the decoder 8 becomes logic one while the remaining decimal number outputs of the decoder 8 are all logic zero. Similarly, in case where the bit position 4 of the counter 7 becomes logic one while the bit positions 3, 5 and 6 become logic zero, the output from the decimal number 2 of the decoder 8 becomes logic one while the remaining the decimal number outputs of the decoder 8 are all logic zero. In other words, regarding the contents in the bit positions 3 through 6 of the counter 7 as a four-bit binary number, the said binary number is converted into a decimal number by way of the corresponding one of a plurality of individual bit parallel decimal number outputs 0 through 15, whereby only one of the decimal number outputs of the decoder 8 correspnding to the converted decimal value becomes logic one, while the remaining decimal number outputs of the decoder 8 all becomes logic zero. A predetermined one of these bit parallel decimal number outputs of the decoder 8 is in advance uniquely selected or allotted to each of the transmitters and receivers, so that the said preselected decimal number output is applied to the converter 9 or 10 as an enabling signal thereof. In the embodiment shown in FIG. 5A, the output of the decimal number 2 of the decoder 8 has been preselected. Therefore, the decimal number output 2 of the decoder 8 becomes logic one in case where the bit position 4, i.e. the fifth bit position, of the counter 7 becomes logic one while the bit positions 3, 5 and 6 become logic zero, whereby the parallel/serial converter 9 or the serial/parallel converter 10 receives an enabling output from the decimal number output 2 of the decoder 8 as a station selection signal. As described previously, the contents in the bit positions 3 through 6 of the counter 7 change each time eight single phase clock pulses are received thereby. Accordingly, the station selection signal is kept supplied to the converter 9 or 10 for the station selection time period when further eight clock pulses are received by the counter 7. In other words, each time eight clock pulses are transmitted, the transmitters and receivers are selected in turn. The order of selection of the stations is determined by which decimal number output of the decoder 8 is selectively connected to the parallel/serial converter 9 or the serial/parallel converter 10.

Figure 5B:
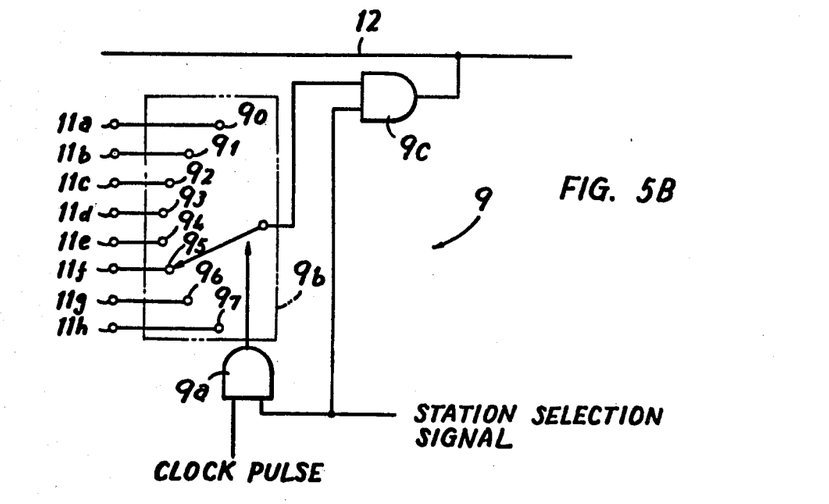
FIG. 5B shows a schematic diagram of one embodiment of the parallel/serial converter 9.

FIG. 5B shows a schematic diagram of one embodiment of the parallel/serial converter 9. The converter 9 shown comprises an AND gate 9a connected to receive the single phase clock pulses and the station selection signal so as to provide a train of clock pulses if and when the station selection signal is received, a switch 9b having a plurality of stationary contacts 90, 91, 92, ... 97 connected to a plurality of bit parallel inputs 11a, 11b, 11c, ... 11h, respectively, a movable contact switchable in turn to the respective stationary contacts as a function of the incoming clock pulses, and an AND gate 9c connected to receive the output from the movable contact of the switch 9b and the station selection signal so as to withdraw the output to the data signal transmission line 12 from the movable contact of the switch 9b if and when the station selection signal is received.

In operation, when a station selection signal is obtained from the station selection circuit 6 (FIG. 1C) implemented by the decoder 8 and the counter 7, the AND gate 9a (FIG. 5B) is enabled, whereby the switch 9b becomes operative in synchronism with the clock pulses, so that the switch 9b is turned sequentially to the stationary contacts 90 through 97, thereby to withdraw the input signals received by the input terminals 11a through 11h, respectively. Since the AND gate 9c has also been enabled, the input signals 11a through 11h are sequentially transmitted over the data signal transmission line 12 as the switch 9b is turned to the respective stationary contacts 90 through 97, respectively. If and when eight clock pulses are received, the station selection signal is no longer obtained from the corresponding decimal number output of the decoder 8, which means that the station in question is not selected. Instead, another station is selected in the same manner.

Figure 5C:
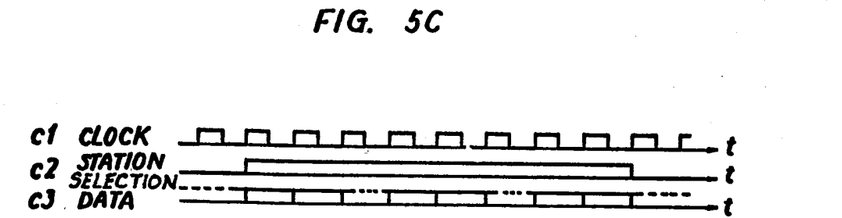
FIG. 5C shows a wave forms of the station selection signal c2 and the data signal c3 with respect to the clock pulse c1.

FIG. 5C shows wave forms of the station selection signal c2 and the data signal c3 with respect to the clock pulses c1.

In the foregoing, a case was described where a plurality of bit parallel digital signals 11a through 11h are applied to the parallel/serial converter 9 in the selected transmitter 3 and converted into a series signal as a function of the clock pulses, whereupon the series signal is outputted over the data signal transmission line 12. On the other hand, the bit parallel outputs 13a through 13h of the receiver 4 are connected from the serial/parallel converter 10, so that the series signal transmitted over the data signal transmission line 12 is converted into a bit parallel signal in the selected receiver 4 as a function of the clock pulses.

Figure 5D:
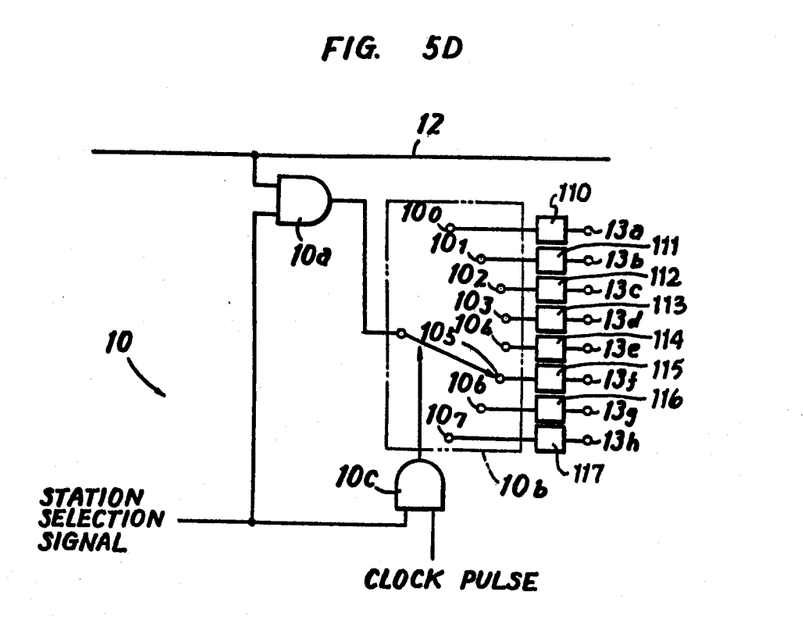
FIG. 5D shows a schematic diagram of one embodiment of the serial/parallel converter 10.

FIG. 5D shows a schematic diagram of one embodiment of the serial/parallel converter 10. The serial/parallel converter 10 is of a circuit configuration adapted to operate contrary to the parallel/serial converter 9. To that end, the converter 10 shown comprises an AND gate 10a, connected to receive the data signal transmitted over the data signal transmission line 12 and the station selection signal to provide the data signal if and when the station selection signal is received, an AND gate 10c connected to receive the station selection signal and the clock pulses to provide the clock pulse output if and when the station selection signal is received, and a switch 10b having a plurality of stationary contacts 100 through 107 connected through memory devices 110 through 117 to a plurality of bit parallel outputs 13a through 13h, respectively, and a movable contact switchable in turn to the respective stationary contacts 100 through 107 as a function of the clock pulses obtainable from the AND gate 10c, thereby to convert the incoming series signal obtainable from the AND gate 10a into an output of the plurality of bits 13a through 13h.

In operation, when a station selection signal is obtained, the AND gate 10a is enabled and the series signal on the data signal transmission line 12 is allowed to pass through the AND gate 10a, to reach the switch 10b. At the same time, the AND gate 10c is enabled, so that the switch 10b becomes operative in synchronism with the clock pulses obtainable from the AND gate 10c. As a result, the switch 10b is turned sequentially to the stationary contacts 100 through 107, storing the data signals transmitted as the function of the clock pulses in the memory devices 110 through 117 and keeping the data unit the next time the station selection signal is activated. Thereafter the bit parallel output signals 13a through 13h, respectively, are withdrawn.

Assuming that the transmitter 3a and the receiver 4a (FIG. 1C) have been simultaneously selected as a function of the station selection signal, when the switch 9b (FIG. 5B) of the parallel/serial converter 9 in the transmitter 3a is in the position of the stationary contact 90, the switch 10b (FIG. 5D) of the serial/parallel converter 10 of the receiver 4a is also in the position of the stationary contact 100, so that the input signal 11a at the stationary contact 90 of the transmitter 3a is transmitted to the output terminal 100 of the receiver 4a as the output signal 13a. Thus, the bit parallel input signals entering from the input terminals 90 through 97 of a given station selected as a function of the station selection signal are transmitted to the output terminals 100 through 107, respectively, of a receiver to be selected simultaneously as a function of the station selection signal, whereby this transmitter and this receiver establish a mating relation for data communication for the time period of a single train of eight clock pulses. After these eight clock pulses are received, the station selection signal turns off as to the above described transmitter and receiver with respect to which the mating relation was established. As a result, the above described mating relation is dissolved as to this transmitter and this receiver. Instead, another transmitter and receiver establish a new mating relation for data communication as a function of the station selection signal to be generated therein. Thus, the mating pair of transmitter and receiver is changed, in turn, each time a train of eight clock pulses is terminated. The mating relation of the selected transmitter and receiver is changed as a succession of clock pulse trains progresses.

For the purpose of synchronization of the transmitters and receivers in the whole system, each clock pulse train is followed by an intermission time period of a given time period. More specifically, a train of clock pulses is discontinued for a given time period upon detection of termination of transmission for one cycle data signal by means of a counter in the rectangular wave generator 1a. Briefly described, when a train of clock pulses is discontinued for the said given time period of the intermission, the counters 7 in the transmitters and receivers in the whole system are simultaneously reset in response to discontinuance of the clock pulses. Thereafter, the succeeding clock pulse train is generated and transmitted again, so that the counters 7 in the respective transmitters and receivers start to count the clock pulses simultaneously starting from the reset state of the counter. As a result, complete synchronization of the transmitters and receivers in the whole system can be maintained.

Figure 6A:
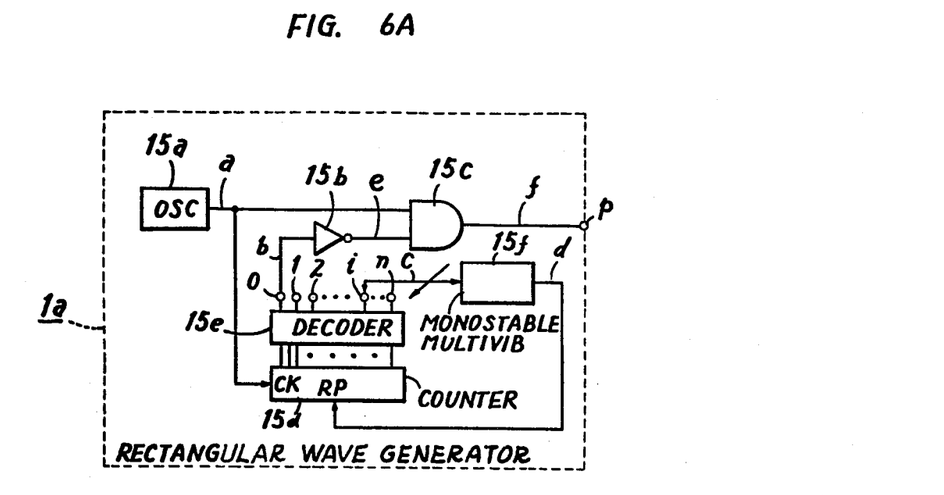
Figure 6B:
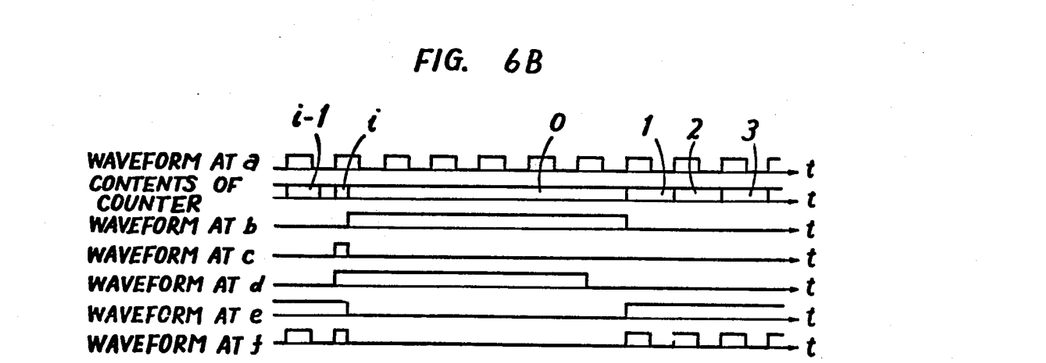
FIG. 6B shows wave forms of the signals at various portions in the FIG. 6A embodiment.

FIG. 6A shows a detailed block diagram of one embodiment of the rectangular wave generator 1a for generating the above described sucession of clock pulse trains including an intermission time period between the consecutive trains. FIG. 6B shows wave forms of the signals at various portions in the FIG. 6A embodiment. The rectangular wave generator 1a shown in FIG. 6A comprises a rectangular wave oscillator 15a which generates pulses of the wave form (a) as a clock pulse. This clock pulse (a) is applied to a counter 15d where the number of the pulses is counted. The contents in the counter 15d are applied to a decoder 15e in bit parallel fashion, so that the count value in the counter 15d is decoded into a plurality of individual decimal number outputs. The output of the decimal number 0 of the decoder 15e is connected through an inverter 15b to one input to an AND gate 15c. The output from the rectangular wave oscillator 15a is connected to another input of the AND gate 15c. The output from the AND gate 15c is withdrawn as an output from the rectangular wave generator 1a. The output of the decimal number i of the decoder 15e is applied to a monostable multivibrator 15f and the output from the monostable multivibrator 15f is applied to the counter 15d as a reset signal thereof.

In operation, unless the count value in the counter 15d is zero, the output of the decimal number zero of the decoder 15e is logic zero and the inverted signal at the point e inverted by the inverter 15b is logic one. Therefore, the AND gate 15c is enabled, so that the output pulses from the rectangular wave oscillator 15a are transmitted through the AND gate 15c to the output terminal p. If and when the count value of the counter 15d becomes the value i, indicating the termination of a train of clock pulses necessary for transmission of one cycle data signal, the output of the decimal number i of the decoder 15e becomes logic one, thereby to trigger the monostable multivibrator 15f. As a result of triggering the monostable multivibrator 15f, the output of logic one is obtained from the monostable multivibrator 15f for a predetermined time period. The counter 15d is responsive to the output from the monostable multivibrator 15f to be kept reset for the said predetermined time period. Therefore, the output of the decimal number zero of the decoder 15e becomes logic one and the output of the inverter 15b becomes logic zero. Accordingly, the AND gate 15c is disabled, so that the output of the AND gate 15c becomes logic zero, with the result that the clock pulse train is discontinued. After the lapse of the said predetermined time period, the output of the monostable multivibrator 15f returns to logic zero, so that the counter 15d is no longer supplied with the reset signal. The counter 15d starts to count again the number of pulses from the rise portion of the following pulse and, if and when the count value in the counter 15d becomes not zero, the AND gate 15c is again enabled, whereby the clock pulses are again transmitted through the AND gate 15c, with the result that the wave form at the point f is obtained with an intermission period commensurate with the said predetermined time period interposed between the preceding clock pulse train for one cycle data signal transmission and the succeeding clock pulse train for one cycle data signal transmission.

Now returning to FIG. 1C it is recalled that, if and when the clock pulse trains are discontinued for a predetermined time period as described above, the reset signal detector 14 of the transmitters 3a, 3b, . . . and the receivers 4a, 4b, . . . become operative, so that the counters 7 of the respective transmitters 3a, 3b, . . . and the receivers 4a, 4b, . . . are reset. In the following, a scheme for resetting the counters 7 in response to the discontinuance for the said predetermined time period of the clock pulse trains will be described.

Figure 7A:
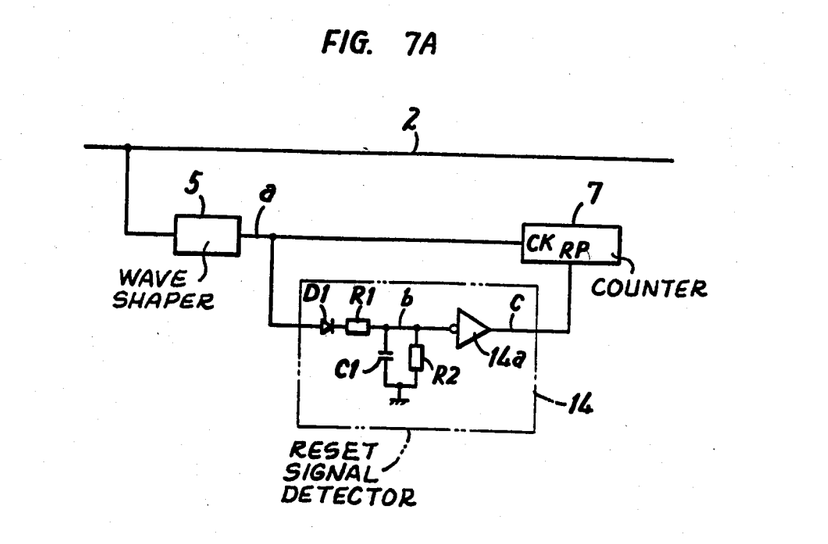
FIG. 7A shows a block diagram of one embodiment of the reset signal detector 14.
Figure 7B:
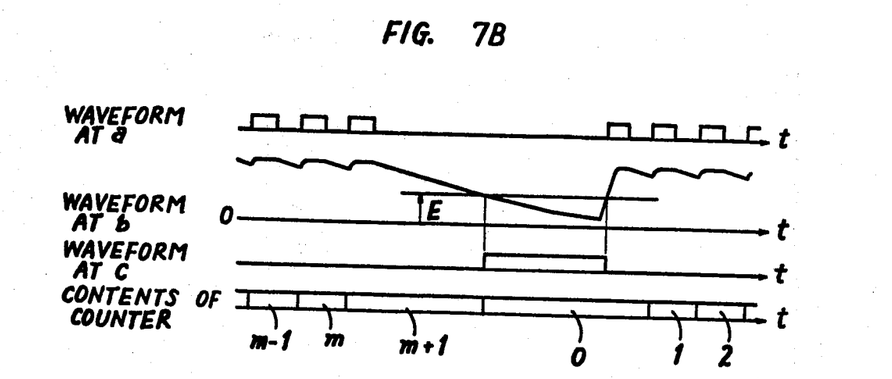
FIG. 7B shows wave forms of the signals at various portions in the FIG. 7A embodiment.

FIG. 7A shows a block diagram of one embodiment of the reset signal detector 14, and FIG. 7B shows wave forms of the signals at various portions in the FIG. 7A embodiment. Referring to FIG. 7A, the reset signal detector 14 comprises a series connection of a diode D1, a resistor R1, and an inverter 14a, with the junction between the resistor R1 and the inverter 14a grounded through a parallel connection of a capacitor C1 and a resister R2. In operation, when successive clock pulses are received by the wave shaper 5, the diode D1 becomes conductive each time the clock pulse becomes logic one and the capacitor C1 is charged through the resistor R1, whereby the charged voltage across capacitor C1 becomes higher. When the clock pulse becomes logic zero, the diode D1 becomes non-conductive, so that the capacitor C1 is not being charged and, in fact, the capacitor C1 is discharged through the resistor R2, so that the charged voltage becomes lower. However, since the discharging resistor R2 has been selected to be sufficiently larger than the charging resistor R1 and since the time constant R2C1 has been selected to be larger as compared with the period of clock pulses, the charged voltage decreases very slowly. When the clock pulse becomes logic one again, the diode D1 becomes conductive to charge the capacitor C1. Accordingly, the input voltage of the inverter 14a is always higher than the threshold level of the inverter 14a, so that the output from the inverter 14a is always logic zero. The output from the inverter 14a is applied to the reset terminal of the counter 7, so that the counter is reset when the output from the inverter 14a is logic one. Therefore, while the clock pulses are successively transmitted, the output from the inverter 14a is the logic zero, so that the clock pulses are counted by the counter 7. When the clock pulses are discontinued for a predetermined time period as shown in FIG. 7B, the charge in the capacitor C1 is discharged through the resistor R2 and the charged voltage decreases gradually. When the charged voltage of the capacitor C1 becomes lower than the threshold level E of the inverter 14a, the output from the inverter 14a shifts from logic zero to logic one. As a result, the counter 7 is reset and remains reset for the said predetermined time period. When the clock pulses are received again, the diode D1 becomes conductive, so that the capacitor C1 is again charged through the resistor R1. Since the time constant R1C1 has been selected to be much smaller, the capacitor C1 is abruptly charged, the output from the inverter 14a becomes logic zero again, and the counter 7 is no longer supplied with the reset signal. Thus, the counter 7 starts again to count the clock pulses. As described above, the counter 7 of the respective transmitters and receivers is reset in response to the intermission of the clock pulses for a predetermined time period, and the counting operation by the counter 7 is regained simultaneously in all the transmitters and receivers starting from the reset state of the counter 7, with the result that complete synchronism of all the transmitters and receivers in the whole system can be maintained.

One aspect of the present invention is that bidirectional multiplex transmission can be achieved with ease on the same transmission line. Some description will be made of the said facilitated bidirectional multiplex transmission on the same transmission line. As described previously, station selection in the respective transmitters and receivers is determined in accordance with the connection of the output of the decoder 8 (FIG. 1C) to the converter 9 or 10. The selected transmitter makes operative the parallel/serial converter 9, whereby a parallel input signal is converted into a series signal and the series signal is transmitted on the data signal transmission line 12. On the other hand, the selected receiver makes operative the serial/parallel converter 10, whereby the series signal on the data signal transmission line 12 is converted into a parallel signal. The arrangement of these transmitters and receivers may be provided in any places where a multiplex transmission line comprising a data signal transmission line 12 and a clock pulse transmission line 2 is available.

Figure 8A:
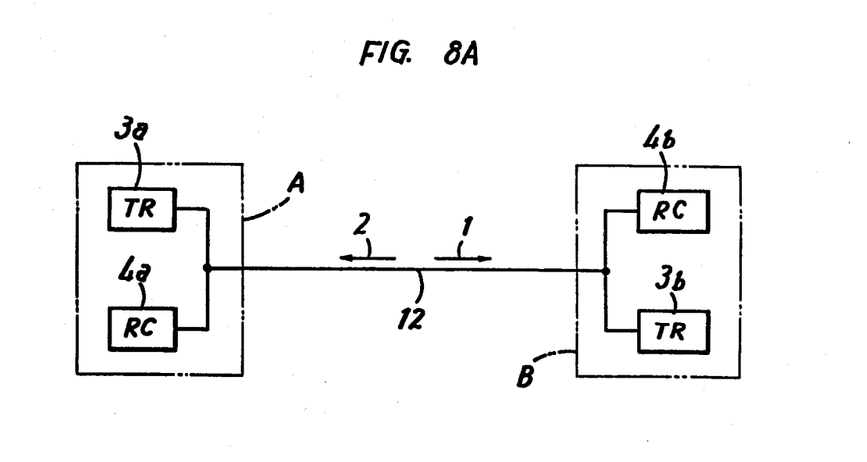
FIG. 8A shows a block diagram of a bidirectional multiplex transmission system in accordance with the present invention.
Figure 8B:
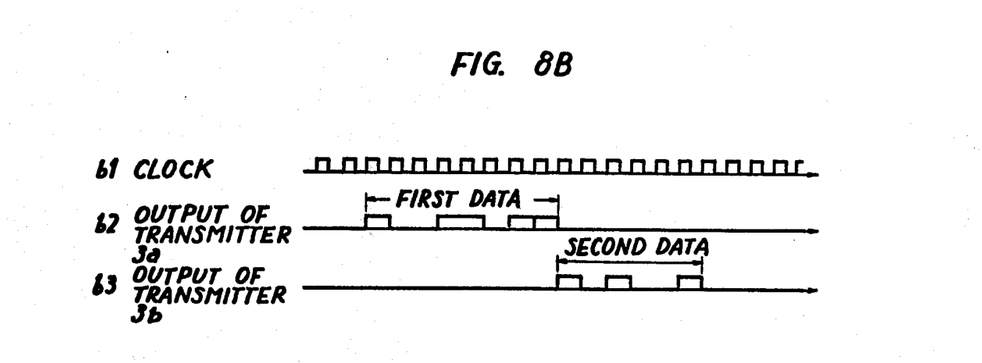
FIG. 8B shows wave forms of the signals at various portions in the FIG. 8A diagram.

FIG. 8A shows a block diagram of bidirectional multiplex transmission system in accordance with the present invention and FIG. 8B shows wave forms of the signals at various portions in the FIG. 8A diagram. Referring to FIG. 8A, a transmitter/receiver casing in the place A comprises a transmitter 3a and a receiver 4a. On the other hand, a transmitter/receiver casing in the place B comprises a transmitter 3b and a receiver 4b. If and when the transmitter 3a is selected, simultaneously the receiver 4b is selected. If and when the transmitter 3b is selected, simultaneously the receiver 4a is selected. Accordingly, a first data transmitted from the transmitter 3a is received by the receiver 4b. On the other hand, a second data transmitted from the transmitter 3b is received by the receiver 4a. The same transmission line 12 is utilized between the transmitter/receiver casing in the place A and the transmitter/receiver casing in the place B for transmission and reception of the data signal. Referring to FIG. 8B, the outputs b2 and b3 from the first and second transmitters 3a and 3b, respectively, are shown with respect to the clock pulses b1, wherein bidirectional signal transmission has been performed. According to the present invention, by determining station selection in the respective transmitters and receivers and the place to be installed of the transmitters and receivers, the direction of the transmission can be selected as desired, so that bidirectional multiplex transmission can be achieved with ease on the same transmission line.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A time division multiplex transmission system for communication of a data signal including a plurality of bits in a time division multiplex manner under common system clock control, comprising
a common system clock generating means for generating two-phase clock pulses including a first train of clock pulses of one phase and a second train of clock pulses of opposite phase,
clock pulse transmission path means coupled to said common system clock generating means for separately transmitting said first train of one phase clock pulses and said second train of opposite phase clock pulses of said two-phase clock pulses,
data signal transmission path means for transmitting said data signal,
at least one transmitter coupled to said clock pulse transmission path means and said data signal transmission path means for transmitting said first and second trains of clock pulses and said data signal, said at least one transmitter comprising means connected to said common system clock generating means for receiving said two-phase clock pulses and for computing a differential value of said first train of one phase clock pulses and said second train of opposite phase clock pulses of said two-phase clock pulses for providing a train of single phase clock pulses, and means responsive to said train of single phase clock pulses for transmitting said data signal in a time division multiplex fashion over said data signal transmission path means, and
at least one receiver coupled to said clock pulse transmission path means and to said data signal transmission path means for receiving said first and second trains of clock pulses and said data signal, said at least one receiver comprising means for computing a differential value of said first train of one polarity clock pulses and said second train of opposite polarity clock pulses for providing a train of single phase clock pulses, and means responsive to said train of single phase clock pulses for receiving said data signal in a time division multiplex fashion from said data signal transmission path means.

2. A time division multiplex transmission system in accordance with claim 1, wherein said common system clock generating means comprises
means for generating said first train of one phase clock pulses, and
means coupled to said means for generating said first train of one phase clock pulses for inverting the polarity of said one phase clock pulses for providing said second train of opposite phase clock pulses.

3. A time division multiplex transmission system in accordance with claim 1, wherein said means for computing said differential value in said at least one transmitter and said at least one receiver each comprises a differential amplifier.

4. A time division multiplex transmission system in accordance with claim 1, wherein said transmitting means of said at least one transmitter comprises
means for receiving a parallel data signal of a plurality of parallel bits, and
means responsive to said train of single phase clock pulses for converting said parallel bits of said parallel data signal into a serial data signal of a plurality of series bits.

5. A time division multiplex transmission system in accordance with claim 1, wherein said at least one transmitter transmits said data signal as a serial data signal of a plurality of series bits, and said receiving means of said at least one receiver comprises
means for receiving said serial data signal,
means responsive to said train of single phase clock pulses for converting said serial data signal of a plurality of series bits into a parallel data signal of a plurality of parallel bits, and
means for holding said parallel data signal of a plurality of parallel bits.

6. A time division multiplex transmission system in accordance with claim 1, wherein each of said first train of one phase clock pulses and said second train of opposite phase clock pulses defines a plurality of station selection timing periods, each station selection timing period corresponding to a plurality of clock pulses required for communication of said data signal,
each said at least one transmitter further comprising enabling means responsive to said train of single phase clock pulses for determining when said station selection timing period of said each said at least one transmitter is occurring, and providing an enabling signal, said transmitting means in said each said at least one transmitter being responsive to said enabling signal for transmitting said data signal, and
each said at least one receiver further comprising enabling means responsive to said train of single phase clock pulses for determining when said station selection timing period of said each said at least one receiver is occurring, and providing an enabling signal, said receiving means in said each said at least one receiver being responsive to said enabling signal for receiving said data signal, at least a predetermined one of said at least one transmitter and a predetermined one of said at least one receiver having the same station selection time period, whereby said predetermined one of said at least one transmitter and said predetermined one of said at least one receiver establish a mating relation during said same station selection time period for communication of the data signal therebetween.

7. A time division multiplex transmission system in accordance with claim 6, wherein each said enabling means in said at least one transmitter and said at least one receiver, respectively, comprises means for counting the number of said station selection time periods to obtain a count value, and means responsive to the count value for decoding the station selection time period to identify said station selection time period of said at least one transmitter and said at least one receiver, respectively.

8. A time division multiplex transmission system in accordance with claim 7, wherein said means for counting the number of said station selection time periods comprises first counter means for counting the number of clock pulses in each said station selection time period up to a predetermined number and producing a corresponding counter output in response thereto, and second counter means for counting the number of counter outputs from said first counter means to provide said count value.

9. A time division multiplex transmission system in accordance with claim 7, further comprising means for disabling generation of said two-phase clock pulses for a predetermined intermission time period at the end of each of said first and second trains of clock pulses of one and opposite phases, respectively, of said two-phase clock pulses wherein each of said at least one transmitter and said at least one receiver further comprises returning means responsive to said predetermined intermission time period for returning, to an initial condition, said enabling means of said at least one transmitter and said at least one receiver, respectively, wherein said returning means comprises means responsive to said predetermined intermission time period for resetting said means for counting the number of said station selection time periods in said enabling means of said at least one transmitter and said at least one receiver, respectively.

10. A time division multiplex transmission system in accordance with claim 6, wherein said common system clock generating means comprises defining means for defining the number of clock pulses of said first and second trains of clock pulses of one and opposite phases, respectively, of said two-phase clock pulses, and means coupled to said defining means for selectively adjusting the defined number of clock pulses.

11. A time division multiplex transmission system in accordance with claim 10, wherein said defining means comprises counter means coupled to said means for generating two-phase clock pulses for counting the number of clock pulses from an initial value up to a predetermined value, detecting means coupled to said counter means for detecting said predetermined count value in said counter means and producing a detection signal, means responsive to said detection signal for resetting said counter means to said initial value, and means responsive to the reset state of said counter means for disabling generation of said two-phase clock pulses by said means for generating said two-phase clock pulses.

12. A time division multiplex transmission system in accordance with claim 6, further comprising means for disabling generation of said two-phase clock pulses for a predetermined intermission time period at the end of each of said first and second trains of clock pulses of one and opposite phases, respectively, of said two-phase clock pulses.

13. A time division multiplex transmission system in accordance with claim 12, wherein each of said at least one transmitter and said at least one receiver further comprises returning means responsive to said predetermined intermission time period for returning, to an initial condition, said enabling means of said at least one transmitter and said at least one receiver, respectively.

14. A time division multiplex transmission system in accordance with claim 1, wherein said means for computing said differential value in said at least one transmitter and said at least one receiver each comprises a voltage comparator.

15. A time division multiplex transmission system in accordance with claim 1, wherein said first and second trains of clock pulses each comprise clock pulses of equal predetermined magnitude.

16. A time division multiplex transmission system for communication of a data signal including a plurality of bits in a time division multiplex manner under common system clock control over a data signal transmission path, and for communication of a clock signal over a clock pulse transmission path, said system comprising a first plurality of transmitters and a second plurality of receivers, said system further comprising:

a common system clock generating means for generating two-phase clock pulses including a first train of successive and regularly repeatable clock pulses of one phase, and a second train of successive and regularly repeatable clock pulses of an inverse phase opposite to said one phase, said two-phase clock pulses being supplied to each transmitter and each receiver over said clock pulse transmission path;

each of said first train of one phase successive and regularly repeatable clock pulses and said second train of inverse phase successive and regularly repeatable clock pulses being long enough to cover a plurality of different station selection timing periods, each of said station selection timing periods corresponding to a respective one of said each transmitter and said each receiver;

said system further comprising at each transmitter and receiver:

providing means connected to said common system clock generating means for receiving said two-phase clock pulses and responsive to said first train of one phase successive and regularly repeatable clock pulses and said second train of inverse phase successive and regularly repeatable clock pulses of said two-phase clock pulses for providing a train of single phase successive and regularly repeatable clock pulses, means responsive to said train of single phase successive and regularly repeatable clock pulses for transmitting, in the case of a transmitter, and receiving, in the case of a receiver, a data signal in a time division multiplex fashion, and means for counting the number of said single phase clock pulses so as to identify said selection time period corresponding to said respective one of said each transmitter and said each receiver, and generating an enabling signal in response thereto, and enabling means responsive to said enabling signal for enabling transmission and reception in said respective one of said each transmitter and said each receiver.

17. A time division multiplex transmission system in accordance with claim 16, wherein said common system clock generating means comprises:

means for generating said first train of successive and regularly repeatable clock pulses of one phase, and means coupled to said means for generating said first train of successive and regularly repeatable clock pulses of one phase for inverting the phase of said successive and regularly repeatable clock pulses of one phase so as to provide said second train of successive and regularly repeatable clock pulses of an inverse phase opposite to said one phase.

18. A time division multiplex transmission system in accordance with claim 16, wherein said providing means comprises computing means for computing a differential value between said first train of one phase successive and regularly repeatable clock pulses and said second train of inverse phase successive and regularly repeatable clock pulses.

19. A time division multiplex transmission system in accordance with claim 18, wherein said computing means comprises a voltage comparator.

20. A time division multiplex transmission system in accordance with claim 18, wherein said computing means comprises a differential amplifier.

21. A time division multiplex transmission system in accordance with claim 16, wherein said first train of one phase successive and regularly repeatable clock pulses and said second train of inverse phase successive and regularly repeatable clock pulses each comprise clock pulses of equal predetermined magnitude.

22. A time division multiplex transmission system in accordance with claim 16, where each said transmitter comprises:

means for receiving a parallel data signal of a plurality of parallel bits, and means responsive to said train of single phase successive and regularly repeatable clock pulses for converting said parallel bits of said parallel data signal into a serial data signal of a plurality of series bits.

23. A time division multiplex transmission system in accordance with claim 16, wherein each said transmitter transmits said data signal as a serial data signal of a plurality of series bits, and each said receiver comprises:

means for receiving said serial data signal, means responsive to said train of single phase regularly repeatable clock pulses for converting said serial data signal of a plurality of series bits into a parallel data signal of a plurality of parallel bits, and means for holding said parallel data signal of a plurality of parallel bits.

24. A time division multiplex transmission system in accordance with claim 16, wherein said means for counting the number of single phase clock pulses counts said single phase clock pulses to a predetermined number corresponding to a single station selection time period, said system further comprising at each transmitter and receiver:

means for counting the number of said single station selection time periods to obtain a count value, and means responsive to the count value for decoding the station selection time period to identify said station selection time period of said each transmitter and said each receiver.

25. A time division multiplex transmission system in accordance with claim 16, said system further comprising means for disabling generation of said two-phase clock pulses for a predetermined intermission time period at the beginning of each of said first train of successive and regularly repeatable clock pulses of one phase and said second train of successive and regularly repeatable clock pulses of said inverse phase.

26. A time division multiplex transmission system in accordance with claim 16, wherein said common system clock generating means comprises defining means for defining the number of clock pulses of said first and second trains of clock pulses of one and inverse phases, respectively, of said two-phase clock pulses, and means coupled to said defining means for selectively adjusting the defined number of clock pulses.

27. A time division multiplex transmission system in accordance with claim 26, wherein said defining means comprises counter means coupled to said means for generating two-phase clock pulses for counting the number of clock pulses from an initial value up to a predetermined value, detecting means coupled to said counter means for detecting said predetermined count value in said counter means and producing a detection signal, means responsive to said detection signal for resetting said counter means to a reset state corresponding to said initial value, and means responsive to the reset state of said counter means for disabling generation of said two-phase clock pulses by said means for generating said two-phase clock pulses.

28. A time division multiplex transmission system in accordance with claim 16, wherein said clock pulse transmission path comprises a first portion over which said first train of one phase successive and regularly repeatable clock pulses is transmitted, and a second portion over which said second train of inverse phase successive and regularly repeatable clock pulses is transmitted.

* * * * *

UNITED STATES PATENT AND TRADEMARK OFFICE
CERTIFICATE OF CORRECTION

PATENT NO. : 4,220,822
DATED : September 2, 1980
INVENTOR(S) : Kawai et al.

It is certified that error appears in the above—identified patent and that said Letters Patent is hereby corrected as shown below:

Column 1, line 20, "form" should be --from--.
Column 2, line 53, after "vulnerable" insert --to--.
Column 3, line 15, after "monly" insert --generated--;
          line 22, "ad" should be --and--;
          line 40, after "provided" insert --and--; "pusle" should be --pulse--.
Column 4, lines 8 and 15, "alotted" should be --allotted--.
Column 5, line 21, "wve" should be --wave--;
          line 33, delete "a".
Column 6, line 29, "rectangle" should be --rectangular--;
          line 30, "ouput" should be --output--;
          line 31, "both indirectly," should be --, both indirectly--;
          line 32, after "directly," insert --is--;
          line 38, "opposite phase" should be --opposite-phase--;
          line 67, "paralel" should be --parallel--.
Column 7, line 29, after "that" delete "no";
          line 39, "opposite phase" should be --opposite-phase--.
*Column 8, lines 6, 12 and 35, after "in" insert --the--.

UNITED STATES PATENT AND TRADEMARK OFFICE
CERTIFICATE OF CORRECTION

PATENT NO. : 4,220,822    Page 2 of 2

DATED : September 2, 1980

INVENTOR(S) : Kawai et al.

It is certified that error appears in the above—identified patent and that said Letters Patent is hereby corrected as shown below:

Column 9, line 41, after "10a" delete --,--;
        line 61, after "10a" delete --,--.
Column 10, line 1, "unit" should be --until--;
        line 24, "off" should be --"off"--.
Column 12, line 12, after "R1" insert --,--.

Signed and Sealed this

Twenty-first Day of April 1981

[SEAL]

Attest:

RENE D. TEGTMEYER

Attesting Officer     Acting Commissioner of Patents and Trademarks